United States Patent [19]

Kim et al.

[11] Patent Number: 4,759,915

[45] Date of Patent: Jul. 26, 1988

[54] PROCESS FOR EXTRACTING TUNGSTEN FROM ALKALI METAL TUNGSTATE SOLUTIONS

[75] Inventors: Tai K. Kim; Alan D. Douglas, both of Towanda; Robert P. McClintic, Monroeton; Martin B. MacInnis, Towanda, all of Pa.

[73] Assignee: GTE Products Corporation, Stamford, Conn.

[21] Appl. No.: 786,453

[22] Filed: Oct. 11, 1985

[51] Int. Cl.$^4$ ............................................. C01G 41/00
[52] U.S. Cl. ................................. 423/54; 75/101 BE
[58] Field of Search ................. 423/54, DIG. 14, 139, 423/54, 658.5; 75/101 BE

[56] References Cited

U.S. PATENT DOCUMENTS

| | | | |
|---|---|---|---|
| 4,175,109 | 11/1979 | Kim | 423/54 |
| 4,238,294 | 12/1980 | Takeuchi et al. | 423/54 |
| 4,360,503 | 11/1982 | Boyer et al. | 423/54 |
| 4,374,099 | 2/1983 | Kim et al. | 423/54 |

Primary Examiner—Edward A. Miller
Attorney, Agent, or Firm—Donald R. Castle; L. Rita Quatrini

[57] ABSTRACT

An improvement is disclosed in a process wherein tungsten values are extracted from an aqueous alkali metal tungstate solution by an organic extractant, and then stripped from the organic with an ammonia solution, the improvement being removing bromine from the major portion of the stripped organic and thereafter using at least a portion of the resulting bromine-free stripped organic to make up at least a portion of the organic extractant.

2 Claims, No Drawings

PROCESS FOR EXTRACTING TUNGSTEN FROM ALKALI METAL TUNGSTATE SOLUTIONS

BACKGROUND OF THE INVENTION

This invention relates to an improvement in a process for extracting tungsten from alkali metal tungstate solutions, the improvement being removing bromine from major portion of the stripped organic prior to reuse of the organic in the extraction step.

U.S. Pat. Nos. 4,175,109, and 4,360,503 and 4,374,099 describe processes for recovery of tungsten from alkali tungstate solutions by solvent extraction with an organic extractant solution consisting essentially of tertiary amines in a solvent which is essentially aromatic.

The problem that exists is that the organic extractant solution becomes contaminated during continued use by various bromine-containing compounds, such as 2-bromonaphthalene, 1-bromo-2,4-diethyl-6-methylbenzene, and others. This contamination causes the phase separation in the tungsten solvent extraction process to be much slower and reduces the rate of throughput to the point at which insufficient tungsten values are provided for subsequent processing.

The spent organic phase can be replaced entirely by new material. However, this is expensive and causes a problem of disposal of the spent materials.

Therefore, a process for removing the bromine compounds from the organic so that the organic can be reconstituted and reused would be an advancement in the art.

Other prior art processes relating to recovery of tungsten include U.S. Pat. Nos. 3,158,438 to Kurtak; 3,256,058 to Burwell; 3,293,004 to Musgrove et al; and 4,360,502 to MacInnis et al; South African Pat. No. 684,892 and British Pat. No. 1,240,524.

SUMMARY OF THE INVENTION

In accordance with one aspect of this invention, there is provided an improvement in a process for extracting tungsten from an aqueous alkali tungstate solution by solvent extraction comprising the steps of: (a) extracting tungsten values into an organic extractant by contacting the aqueous alkali tungstate solution with the organic extractant for a sufficient time to form a loaded organic extractant containing tungsten values and an aqueous solution, the organic extractant consisting essentially of from about 6 to about 10 percent by volume of a mixture of tri-alkyl amines having tri-alkyl chains of about 6 to 10 carbon atoms with tri-isooctyl amine being the major component in the mixture and from 90 to 94 percent by volume of an aromatic solvent consisting essentially of a mixture of alkyl benzenes wherein the alkyl benzenes have molecular weights of 120, 134, 148 and the total number of carbon atoms in the alkyl chains attached to the benzene ring are either 3, 4, or 5; (b) separating the loaded organic extractant from the aqueous solution; (c) stripping the loaded organic extractant from step (b) by contacting the loaded organic with an aqueous ammonia solution to form an aqueous ammonium tungstate solution and a stripped organic extractant; and (d) feeding the stripped organic extractant to step (a) for use as the organic extractant, the improvement comprising removing bromine from the major portion of the stripped organic and thereafter using at least a portion of the resulting bromine-free stripped organic to make up at least a portion of the organic extractant in step (a).

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

U.S. Pat. No. 4,175,109 describes a process wherein tungsten values are extracted from an aqueous alkali metal tungstate solution containing impurities by an organic extractant solution which consists essentially of from about 6 to about 10 percent by volume of a mixture of tri-alkyl amines having alkyl chains of about 6 to 10 carbon atoms with tri-isooctyl amine being the major component in the mixture and from about 90 to 94 percent by volume of an aromatic solvent consisting essentially of a mixture of alkyl benzenes wherein the alkyl benzenes have molecular weights of 120, 134 or 148 and the total number of carbon atoms in the alkyl chains attached to the benzene ring are either 3, 4, or 5. The tungsten values are then removed from the organic extractant solution by stripping with aqueous ammonia. That patent is herein incorporated by reference.

U.S. Pat. No. 4,360,503 describes a process for recovery of tungsten from alkali tungstate solutions by solvent extraction in which the striped organic is washed to form a wash solution which is mixed with concentrated ammonia solution to form an aqueous ammonia solution which is mixed with product ammonium tungstate and fed as the stripping solution for contacting with the loaded organic extractant. The stripped organic is recycled to the stripping cell to adjust the organic to aqueous phase ratio so that the system is maintained in the organic continuous state. That patent is herein incorporated by reference.

U.S. Pat. No. 4,374,099 describes a process for producing ammonium tungstate from an aqueous alkali metal tungstate solution by the extraction step described above. The loaded organic extractant is then stripped with an ammonia solution consisting essentially of water and from about 5% to about 21% by weight ammonium hydroxide at a pH of from about 12 to about 13. That patent is herein incorporated by reference.

It has been found in the operation of the above described processes that problems occur after the system has been operating continuously for a period of time.

One problem is phase separation and an increase in sensitivity to sodium by the organic especially at the higher flow rates. This leads to ultimate sodium contamination in the tungsten product.

Also, in parts of the system, there are problems in maintaining the system in the organic continuous phase. When organic and aqueous phases are contacted, in an organic continuous phase, the aqueous phase is dispersed in the organic. In an aqueous continuous phase, the organic is dispersed in the aqueous phase. It is desirable to maintain an organic continuous phase. In this condition, the subsequent phase disengagement is satisfactory. When an aqueous continuous phase exists, besides the sodium sensitivity and contamination problem, the ammonium paratungstate product of the stripping operation prematurely precipitates in the stripping container causing causing problems in the actual operation of the equipment, and much downtime.

It has been found that the conversion to the undesirable aqueous continuous state is due in large part to contamination of the system by bromine. It has been found that as the system operates continuously and the organic is put through numerous extract-strip cycles, it becomes contaminated with a build up of bromine, in particular, the bromine compounds described previously.

Therefore, the bromine is contributing to the aforementioned phase separation and contamination problems. It is believed that bromine is present in very small amounts in the sodium hydroxide which is used to form the alkali tungstate solution and is built up in the system with repeated extract-strip cycles.

The improvement of this invention provides a method for overcoming the problem of bromine contamination, and therefore the aforementioned problems.

It is to be understood that any method which results in removal of essentially all the bromine or more particularly, bromine compounds from the stripped organic extractant can be used without departing from the scope of the present invention.

In accordance with a preferred embodiment of this invention, the bromine or more particularly the bromine containing compounds are removed from the striped organic by fractionally distilling the stripped organic to form a first fraction consisting essentially of the solvent, a second fraction which contains the bromine and/or bromine containing compounds, and a third fraction consisting essentially of the amines.

The following is a description of the especially preferred method of fractionally distilling the stripped organic. It is to be understood that the particular technique of fractionally distilling will depend on the nature of the apparatus used and variations will not depart from the scope of the invention.

The distillation process can be done by means of an apparatus which consists of a container for the organic, such as a flask, a heating device such as a heating mantle, a packed fractionating column, a distilling head, a distillate receiver, a reflux splitter solenoid, and a timer.

The flask is used for boiling the stripped or spent organic liquid and is a round bottom flask of about a 2 liter size having three openings or necks each with a standard-type ground glass joint. The center neck connects to the fractionating column, one side neck receives a thermometer, and the other side neck is used for charging the starting spent organic and then closed during operation with a ground glass stopper. The thermometer likewise has a ground-glass section for a tight seal. It measures the primary vapor temperature near the boiling liquid and is calibrated from about $-10°$ to about $+360°$ C.

The heating mantle covers both the top and botton halves of the flask and is energized by a variable transformer which is adjusted manually to provide the proper input voltage for the mantle. The exposed portions of the flask around the three necks are covered with thermal insulation.

The fractionating column is glass, about 25 mm in diameter with a packed length of about 36 inches. It has an unsilvered vacuum jacket covering this length. The packing is preferably Goodloe type fabricated from 316 stainless steel wire mesh. The column including the packing is from Metex Process Equipment Corporation of Edison, N.J. who claim this is equivalent to about 20 theoretical stages with a high throughput and up to about 35 theoretical stages at a low rate. The column is insulated with aluminum foil and fiberglass between which are inserted heating tapes which are energized by a low voltage which is just sufficient to replace the heat that is otherwise lost from the vapor and liquid in the column.

The distilling head is also glass and includes a water cooled condenser for complete condensation of the vapor from the fractionating column. The condensate is collected and fed through a funnel which can be tilted by electromagnetic attraction for an iron slug enclosed on the side of the funnel stem. This action determines whether the condensate is returned to the top of the column as reflux, or to a product take off line. An electromagnetic coil outside the head for operation of the splitting funnel is energized on a timed basis by an automatic electric timer which may be set for a number of seconds "off" and a number of seconds "on". The head also includes a thermometer for measurement of the vapor-liquid equilibrium temperature above the column. The head also includes some simple plumbing for handling the product without loss of vapor from the system and for permitting product to be taken to atmospheric pressure when the distillation is carried out under vacuum without disrupting the operation of the column.

The distillate receiver is preferably a graduated cylinder that is clamped in position under the discharge port on the head. It can easily be removed for emptying when the product-line stopcock is closed. When the distillation is carried out under vacuum the distillate receiver is a closed vessel with a standard-taper joint for connecting to the head and a stopcock for venting air into it prior to its removal.

The operation of such a fractional distillation column is not new, but is a widely used technique for separation of liquids having different vapor pressures.

Removal of the bromine-containing compounds from the organic by fractional distillation is possible because the vapor pressure of the bromine-containing compounds is less than the vapor pressure of the various components making up the solvent portion, and is greater than the vapor pressure of the amine components of the organic. It was found that a simple distillation, that is, a distillation without a fractionating column does not provide a very good separation of the bromine compounds from the components of the organic.

The principles of operation of a fractional distillation process are well known and described in prior art literature. The pertinent details of operation of the previously described apparatus includes reflux ratios and equilibrium vapor temperature at which the various fractions are taken. Also, a heating tape is wrapped around the product take-off line to prevent crystallization of any compounds in the distillate which are normally solid at room temperature, such as naphthalene.

The reflux ratio is determined by the settings for number of seconds "on" and number of seconds "off" on the timer, and is equivalent to the ratio "off" to "on". For example, the timer is set for about 18 seconds off and about 6 seconds on to obtain a reflux ratio of about 3. This invention can be operated over a wide range of reflux ratios, such as from about ratio of about 1 to at least a ratio of about 60. However, the preferred range is from about 2 to 5. The higher ratios give better bromine removal but also require much more energy input than the lower ratios, and also much larger capital investments to obtain a comparable rate of production of distilled organic components.

The equilibrium vapor temperature at which the first fraction which is essentially the solvent, is taken leaving behind a first remaining portion of the organic is between about 215° C. and about 220° C., based on a pressure of about 760 Torr (1 atmosphere). The temperature can be varied in this range depending on how efficient a removal of bromine from the solvent portion of the organic is required. The more bromine that can be tolerated in the solvent, the higher the equilibrium vapor temperature above the column can be when the first fraction is taken. Usually, a temperature of about 215° C. corresponds to a first fraction volume of about 75% of the initial charge, while a temperature of about 220° C. corresponds to about 85% of the charge. At a temperature of above about 220° C. there is essentially no diminution of the bromine concentration in the first fraction from that in the starting organic. This entire distillation can be carried out under vacuum also, in which case, the equilibrium vapor pressures are correspondingly lower.

A second fraction starting at an overhead equilibrium vapor temperature of the first remaining portion of the organic of between about 215° C. and about 220° C. is then taken, leaving behind a second portion of the organic. This second fraction contains a large amount of the bromine and is discarded as a much smaller volume of waste material than the entire amount of spent organic would have been without the practice of this invention. The volume of this second fraction is typically from abaout 5% to about 20% of the initial volume of the spent organic, depending on the exact temperature at which the first fraction is taken, the reflux ratio, and the temperature at which the second fraction is taken.

After the second, bromine-rich fraction is taken, a third fraction, the amine-rich fraction is taken. This part of the distillation can be done at atmospheric pressure in which case high temperatures, that is, over about 300° C. are required. Or it can be done preferably under vacuum, in which case the temperature is in the range of from about 135° C. to about 155° C., depending on the absolute pressure in the column and flask. This vacuum distillation is carried out in a similar manner to atmospheric distillation except that the receiver is also under vacuum and must be sealed to the head, and a tubulature on the head is connected to a vacuum pump through a suitable trap. A relatively high reflux ratio is desirable for good separation of the amine fraction from the remaining portion which consiste essentially of bromine and some amines and which is discarded. A reflux ratio in the range of from about 20 to about 60 is used with good results. However, a lower reflux ratio can also be used with good results, such as a ratio in the range of from about 2 to about 20.

The amine fraction and the solvent fraction can be used to form the organic extractant solution which is used to extract tungsten. It will be obvious that the relative fractions can be treated as fresh reagents and therefore can be used individually as needed in making up the organic.

To more fully illustrate this invention, the following nonlimiting example is presented.

EXAMPLE

The following experiment is performed to compare the extraction system consisting essentially of about 8% by volume Adogen 381, a commercial tertiary amine and about 82% by volume SC#150, a commercial high aromatic solvent in (1) in the spent state, that is after being used continuously in a solvent extraction operation, (2) with the solvent and amines having been reclaimed by fractional distillation, (3) in the as state in which the amines and solvent are used as received from the manufacturer, and (4) with the amine being in the as is state, and the solvent having been reclaimed by fractional distillation. A laboratory counter current mixer-settler unit is used consisting of three counter current extraction stages, one water wash stage for the loaded organic, a stripping cirçiut consisting of a contactor cell and a settling cell, a water wash stage for the stripped organic and a regeneration stage for the stripped organic the system being modeled after the counter current extraction-stripping circuits described in U.S. Pat. No. 4,360,503. The system is operated for a number of hours. The aqueous alkali tungstate feed solution is prepared by a well known caustic digestion process and the pH is adjusted to about 2.0 with a mineral acid such as sulfuric acid. After the extraction, the raffinate contains about 0.1 g$WO_3$/l. The tungsten loaded organic phase is washed with deionized water and contacted with about 9.5% by weight ammonia at a pH of about 12 prepared by diluting concentrated ammonium hydroxide. The stripped organic is washed with deionized water and then contacted with about 1.5N sulfuric acid solution to regenerate it. The regenerated organic is then recycled to the extraction circuit. Each organic system is observed for frequency of conversion to the aqueous continuous phase. After operation, each organic is analyzed for bromine content. Table 1 shows the bromine concentration increase in the organic with operation time. Table 2 summarizes the frequency of the conversion to the aqueous continuous phase during the 55 hour operation.

TABLE 1

| Bromine Concentration in Organics | | | |
|---|---|---|---|
| | Bromine Concentration Increase g/l Mixer-Settler Operation, Hours | | |
| System | 25 | 43 | 55 |
| Spent Organic | 0.09 | 0.23 | 0.52 |
| Reclaimed Organic | 0.0 | 0.0 | 0.01 |
| As Is Organic | 0.05 | 0.10 | 0.14 |
| As Is Amine Reclaimed Solvent | 0.0 | 0.0 | 0.01 |

TABLE 2

| Frequency of Conversion of Organic Continuous To Aqueous Continuous Phase 55 Hour Operation | |
|---|---|
| System | Frequency of Conversion |
| Spent Organic | 2 |
| Reclaimed Organic | 0 |
| As Is Organic | 5 |
| As Is Amine Reclaimed Solvent | 0 |

Table 1 shows that the spent organic has a relatively high concentration of bromine. The organic made from fractionally distilled and reclaimed components is at least as low in bromine as the as is organic.

Table 2 shows that with the organic made from the fractionally distilled components there is no conversion to the undesirable aqueous continuous phase during the operation, whereas with the spent and as is organic, there is conversion to the aqueous continuous phase.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process for extracting tungsten from an aqueous alkali tungstate solution by solvent extraction comprising the steps of: (a) extracting tungsten values into an organic extractant containing minor amounts of bromine compounds by contacting said aqueous alkali metal tungstate solution with said organic extractant for a sufficient period of time to form a loaded organic extractant containing tungsten values and an aqueous solution, said organic extractant consisting essentially of from about 6 to about 10 percent by volume of a mixture of tri-alkyl amines having tri-alkyl chains of about 6 to 10 carbon atoms with tri-isooctyl amine being the major component in said mixture and from 90 to 94 percent by volume of an aromatic solvent consisting essentially of a mixture of alkyl benzene wherein the alkyl benzenes have molecular weights of 120, 134, 148 and the total number of carbon atoms in the alkyl chains attached to the benzene ring are either 3, 4, or 5; (b) separating said loaded organic extractant from said aqueous solution containing a portion of said impurities; (c) stripping said loaded organic extractant from step (b) by contacting with an aqueous ammonia solution to form an aqueous ammonium tungstate solution and a stripped organic extractant; and feeding said stripped organic extractant to step (a) for use as said organic extractant, the improvement comprising removing said bromine compounds from the major portion of said stripped organic and thereafter using at least a portion of the resulting bromine free stripped organic to make up at least a portion of the organic extractant in step (a).

2. An improvement of claim 1 wherein the bromine compounds are removed from said stripped organic by fractionally distilling said stripped organic to form a first fraction consisting essentially of said solvent, a second fraction comprising said bromine compounds, and a third fraction consisting essentially of said amines and recycling at least portions of said first and third fractions as a part of said organic extractant.

* * * * *